US010990787B2

(12) United States Patent
Bjerre

(10) Patent No.: US 10,990,787 B2
(45) Date of Patent: Apr. 27, 2021

(54) ENROLMENT OF A FINGERPRINT TEMPLATE

(71) Applicant: FINGERPRINT CARDS AB, Gothenburg (SE)

(72) Inventor: Troels Bjerre, Valby (DK)

(73) Assignee: FINGERPRINT CARDS AB, Gothenburg (SE)

( * ) Notice: Subject to any disclaimer, the term of this patent is extended or adjusted under 35 U.S.C. 154(b) by 0 days.

(21) Appl. No.: 16/710,071

(22) Filed: Dec. 11, 2019

(65) Prior Publication Data

US 2020/0302145 A1 Sep. 24, 2020

(30) Foreign Application Priority Data

Mar. 20, 2019 (SE) .................................... 1950344-0

(51) Int. Cl.
*G06K 9/00* (2006.01)
*G06F 21/32* (2013.01)
(52) U.S. Cl.
CPC ......... *G06K 9/00026* (2013.01); *G06F 21/32* (2013.01); *G06K 9/001* (2013.01); *G06K 9/00067* (2013.01)
(58) Field of Classification Search
CPC ........... G06K 9/00026; G06K 9/00067; G06K 9/001; G06K 9/00073; G06F 21/32
See application file for complete search history.

(56) References Cited

U.S. PATENT DOCUMENTS

| 9,268,991 | B2 | 2/2016 | Russo et al. |
| 2015/0131876 | A1 | 5/2015 | Chang |
| 2016/0147825 | A1 | 5/2016 | Chiang et al. |
| 2017/0206345 | A1 | 7/2017 | LaCous et al. |
| 2017/0220846 | A1 | 8/2017 | Du et al. |
| 2018/0137332 | A1* | 5/2018 | Andersen ........... G06K 9/00087 |
| 2018/0196990 | A1 | 7/2018 | Xu et al. |

OTHER PUBLICATIONS

Swedish Search Report dated Oct. 17, 2019 for Swedish Application No. 1950344-0, 2 pages.

* cited by examiner

*Primary Examiner* — Abhishek Sarma
(74) *Attorney, Agent, or Firm* — RMCK Law Group, PLC

(57) ABSTRACT

The present disclosure relates to a method performed in an electronic device comprising a fingerprint sensor. For each of a plurality of consecutive sub-templates, the method comprises determining that a fingerprint is in proximity to the fingerprint sensor as part of an interaction with the fingerprint sensor; extracting the sub-template from a captured image of the fingerprint; obtaining an indication about whether the fingerprint was in proximity to the sensor also during a time period prior to the determining; defining the interaction as a slide interaction if the fingerprint was in proximity or as a touch interaction if the fingerprint was not in proximity; and based on whether the interaction is defined as a slide interaction or a touch interaction, advancing an enrolment progress. When the enrolment progress is above a predetermined threshold, a template compiled from the sub-templates is enrolled.

13 Claims, 4 Drawing Sheets

ENROLMENT OF A FINGERPRINT TEMPLATE

TECHNICAL FIELD

The present disclosure relates to a method and device for enrolment of a fingerprint template in a fingerprint sensing system.

BACKGROUND

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

A user of the fingerprint sensing systems allows the topography of a fingerprint to be detected by the fingerprint sensor which forms a template which is enrolled and stored in the fingerprint sensing systems for later use in verifying a later detected fingerprint by comparing it with the stored template.

As fingerprint sensors have become a commodity, reducing production cost is becoming increasingly important. One way of driving down cost is reducing the sensor area size.

SUMMARY

It is an objective of the present invention to facilitate enrolment of a suitable fingerprint template by means of a fingerprint sensor of a reduced size.

For a user, reducing the sensor area has the impact, that enrolment with a sequence of touches will become more cumbersome as more touch interactions are needed in order to properly cover enough area of the topography of the fingerprint to allow the formation of a suitable fingerprint template.

It has now been realized that it may be convenient to use swipe (slide) interaction with the sensor, where the fingerprint topography of a user finger is sliding over the detection surface of the fingerprint sensor rather than only touch interactions where the topography is applied and then removed from the detection surface, or a combination of slide and touch interactions to obtain the fingerprint template. Embodiments of the present invention allow the user to obtain a template using touch and/or slide interactions on the detection surface. By sliding on the detection surface, the user can allow the sensor (typically comprising a two-dimensional array of sensor elements) to quickly cover a large area of the fingerprint topography. Embodiments seek to ensure that a template enrolled in this manner is of sufficient quality for subsequent authentication attempts, i.e. contains sub-templates (ST) covering as much of the fingerprint topography as possible, while also factoring in that the user experience should be simple.

According to an aspect of the present invention, there is provided a method performed in an electronic device comprising a fingerprint sensing system comprising a fingerprint sensor. The method is for enrolling a fingerprint template compiled from a time sequence of sub-templates. For each of a plurality of consecutive sub-templates of the time sequence and by means of the fingerprint sensing system, the method comprises determining that a fingerprint topography of a finger is in proximity to a detection surface of the fingerprint sensor as part of an interaction of the finger with the fingerprint sensor. The method also comprises extracting the sub-template from a captured image of the topography, which sub-template is consecutive to a preceding sub-template in the time sequence. The method also comprises obtaining an indication about whether or not the topography remained in proximity to the detection surface during a time period between capturing an image from which the preceding sub-template was extracted and the determining that the topography is in proximity to the detection surface. The method also comprises defining the interaction as a slide interaction if, according to the obtained indication, the topography remained in proximity to the detection surface, or as a touch interaction if, according to the obtained indication, the topography did not remain in proximity to the detection surface during said time period. The method also comprises, based on whether the interaction is defined as a slide interaction or a touch interaction, advancing an enrolment progress. Then, the method also comprises, when the enrolment progress has been advanced to above a predetermined enrolment threshold, enrolling the template compiled from the sub-templates.

According to another aspect of the present invention, there is provided a computer program product comprising computer-executable components for causing an electronic device to perform the method of any preceding claim when the computer-executable components are run on processing circuitry comprised in the electronic device.

According to another aspect of the present invention, there is provided a fingerprint sensing system comprising a fingerprint sensor, processing circuitry, and data storage storing instructions executable by said processing circuitry whereby said fingerprint sensing system is operative to, for each of a plurality of consecutive sub-templates of the time sequence: determine that a fingerprint topography of a finger is in proximity to a detection surface of the fingerprint sensor as part of an interaction of the finger with the fingerprint sensor; capture the sub-template of the topography, consecutive to a preceding sub-template in the time sequence; obtain an indication of that the topography remained in proximity to the detection surface during a time period between capturing of the preceding sub-template and the determining that the topography is in proximity to the detection surface, or that the topography did not remain in proximity to the detection surface during said time period; define the interaction as a slide interaction if, according to the obtained indication, the topography remained in proximity to the detection surface, or as a touch interaction if, according to the obtained indication, the topography did not remain in proximity to the detection surface during said time period; and based on whether the interaction is defined as a slide interaction or a touch interaction, advance an enrolment progress. The system is also operative to, when the enrolment progress is above a predetermined enrolment threshold, enrol the compiled template.

According to another aspect of the present invention, there is provided an electronic device comprising an embodiment of the fingerprint sensing system of the present disclosure.

By basing the progress of the enrolment on whether the interaction is defined as a slide interaction or a touch interaction, sub-templates resulting from different types of interactions can be given different weight in accordance with predetermined (typically empiric) factors. This allows sub-templates from both touch and slide interactions to be combined in the compiling of a template. For instance, sub-templates from a slide interaction may be given a lesser weight in the advancement of the enrolment since there may be less new part of the topography covered compared with the previous sub-template.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
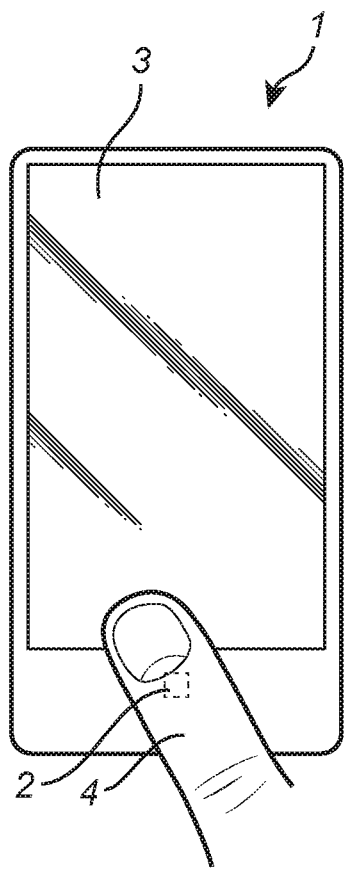
FIG. 1 is a schematic illustration of an embodiment of an electronic device comprising a fingerprint sensor interacting with a finger of a user, in accordance with the present invention.

FIG. 1 shows an electronic device 1, here in the form of mobile phone, e.g. smartphone, comprising a display stack 3, e.g. comprising touch functionality (i.e. a touch display) and a fingerprint sensor 2. The fingerprint sensor 2 comprises fingerprint sensor circuitry, e.g. for outputting a grey-scale image or the like where different intensities in the image indicate the contact between a detection surface of the fingerprint sensor 2 and a fingerprint topography of a finger 4 placed there on, e.g. as part of fingerprint enrolment or authentication, or navigation using the fingerprint sensor.

The fingerprint sensor 2 may operate according to any sensing technology. For instance, the fingerprint sensor may be a capacitive, optical, thermal or ultrasonic sensor. Herein, a capacitive fingerprint sensor, which may be preferred for some applications, is discussed as an example. The fingerprint sensor may comprise a two-dimensional array of fingerprint sensing elements, each corresponding to a pixel of the image outputted (captured) by the fingerprint sensor, the pixel e.g. being represented by a grey-scale value. The fingerprint sensor may be located at a side of the display 3, outside of the display area of the display, as shown in FIG. 1, or it may be located within said display area. From the captured image, a sub-template may be extracted as discussed herein, and a plurality of sequential sub-templates may be used for compiling the template which may then be enrolled. The image may for instance be in the form of a two-dimensional or one-dimensional pixel array, e.g. of grey-scale values. Each image pixel may provide an image intensity, be it of a grey-scale value or other value. For example, for a capacitive fingerprint sensor, a high pixel intensity (e.g. white in grey-scale) implies low capacitive coupling and thus a large sensed distance between the detection surface and the fingerprint topography. A high pixel intensity may result because the finger does not cover the part of the detection surface where the sensing element corresponding to the pixel is located. Conversely, a low pixel intensity (e.g. black in grey-scale) implies high capacitive coupling and thus a small sensed distance between the detection surface and the fingerprint topography. A high pixel intensity may result because the corresponding sensing element is located at a ridge of the fingerprint topography. An intermediate pixel intensity may indicate that the sensing element is covered by the finger topology but is located at a valley of the fingerprint topography.

From each image on which a sub-template is based, features may be extracted, e.g. minutiae such as bifurcations and ridge endings, as well as other characterizing features of the fingerprint to be enrolled. Each feature may be associated with a set of x- and y-, or other location defining, coordinates, specifying their respective locations within the image. The features, with their respective associated coordinates extracted from the image may be included in the template.

A template, as discussed herein, may be regarded as a container for information associated with the images, including e.g. features (associated with coordinates), user identifier (ID), finger ID and/or other information.

Figure 2:
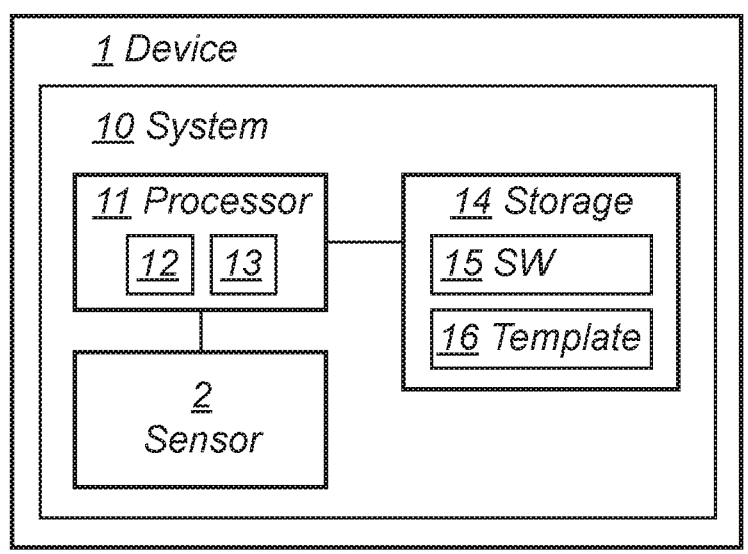
FIG. 2 is a schematic block diagram of an embodiment of a fingerprint sensing system of an electronic device, in accordance with the present invention.

FIG. 2 is a schematic block diagram of an embodiment of a fingerprint sensing system 10 of an electronic device 1, e.g. as in FIG. 1. The system 10 comprises processing circuitry 11 e.g. a central processing unit (CPU). The processing circuitry 11 may comprise one or a plurality of processing units in the form of microprocessor(s). However, other suitable devices with computing capabilities could be comprised in the processing circuitry 11, e.g. an application specific integrated circuit (ASIC), a field programmable gate array (FPGA) or a complex programmable logic device (CPLD). The processing circuitry 11 is configured to run one or several computer program(s) or software (SW) 15 stored in a data storage 14 of one or several storage unit(s) e.g. a memory. By running the SW 15, applications comprising at least a part of the processing circuitry 11 may be formed, such as fingerprint image obtaining circuitry 12 configured for obtaining e.g. a fingerprint image by means of the fingerprint sensor 2 in the system 10, and image processing circuitry 13 configured for image processing e.g. of the obtained fingerprint image e.g. for extracting a sub-template (typically including features from the image) and for compiling a template from the sub-templates. The storage unit is regarded as a computer readable means or computer program product 14 as discussed herein and may e.g. be in the form of a Random Access Memory (RAM), a Flash memory or other solid state memory, or a hard disk, or be a combination thereof. The processing circuitry 11 may also be configured to store information in the storage 14, as needed.

The electronic device 1 may be any device comprising a fingerprint sensor 2 and able to process images obtained by means of said fingerprint sensor. For instance, the device 1 may be any of a mobile phone e.g. a smartphone, a smart card, a tablet computer, a portable computer e.g. a laptop computer, or a stationary computer e.g. a desktop computer, a server or a mainframe computer.

Figure 3:
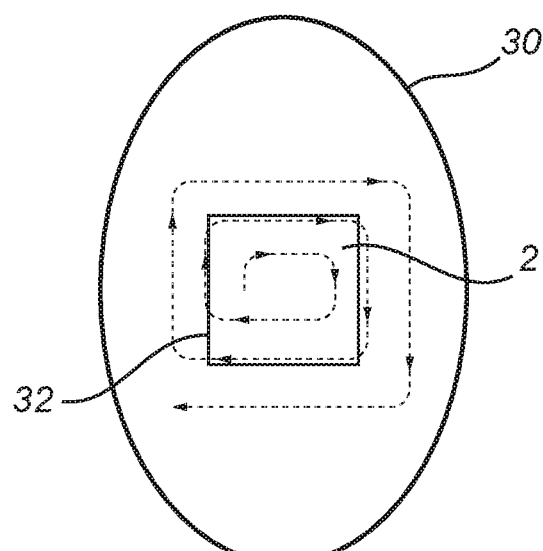
FIG. 3 schematically illustrates an embodiment of a slide interaction of a fingerprint topography over a detection surface of a fingerprint sensor, in accordance with the present invention.

FIG. 3 illustrates a slide interaction of a fingerprint topography 30 over a detection surface 32 of a fingerprint sensor 2. The figure also schematically illustrates (by a dotted arrowed path) an example of a sliding path which may be taken by the fingerprint topography of a finger 4 while in contact with, or in sufficient proximity of, the detection surface 32 for a slide interaction there between.

A slide interaction can e.g. be in a spiral path (as illustrated in FIG. 3) or in any other path, e.g. circular, left-right and/or up-down. The exact slide path may not be important, but a circular or spiral slide path may be preferred in some embodiments to make sure that the user moves the finger 4 around to enough cover more of the fingerprint topography than would be achieved in a single horizontal or vertical slide.

Figure 4:
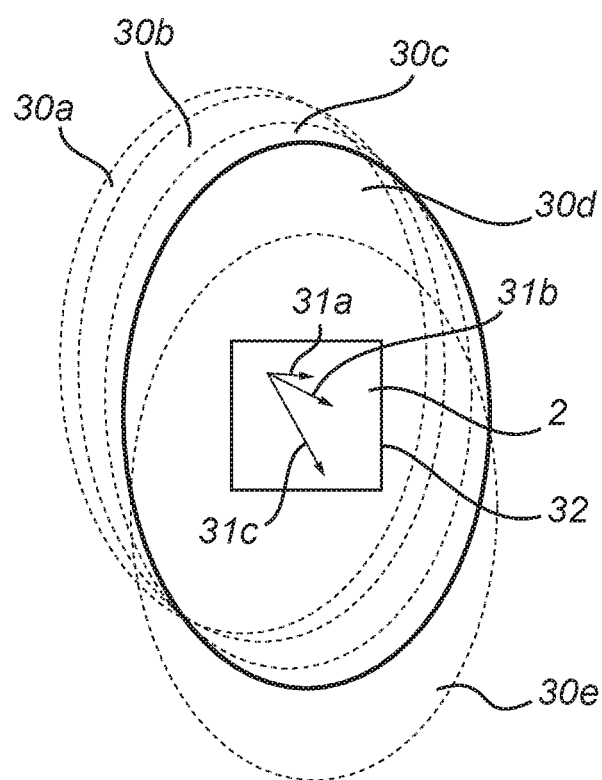
FIG. 4 schematically illustrates translations of a fingerprint topography over a detection surface of a fingerprint sensor between consecutive captured images of the topography during an embodiment of a slide interaction, in accordance with the present invention.

FIG. 4 illustrates respective translations 31 of a fingerprint topography 30 over a detection surface 32 of a fingerprint sensor 2 between consecutive captured images of the topography during a slide interaction.

Regardless of whether the interaction between the topography 30 and the detection surface 32 (i.e. when the topography is in contact with the detection surface or in sufficient proximity of said detection surface to allow images of the topography to be captured) the sensor may continuously attempt to capture images of the topography during said interaction until the enrolment threshold has been reached or surpassed. The images may be captured at a predetermined time interval, e.g. at a rate of a predetermined number of images per second.

During a slide interaction, as shown in FIG. 4, between two consecutively captured images, the topography 30 has moved (translated) in accordance with a translation 31 as schematically indicated by arrows in FIG. 4. Thus, there is a translation 31 between each two of the consecutive topography positions 30a, 30b, 30c, 30d and 30e corresponding to images consecutively captured by the sensor 2. There is a first translation 31a between the first topography position 30a and the second topography position 30b, a second translation 31b between the second topography position 30b and the third topography position 30c, a third translation 31c between the third topography position 30c and the fourth topography position 30d etc.

Whether or not a captured image is accepted to form basis for a sub-template which is used for compiling the template 16 may be dependent on the value of the translation 31 between the image and the image forming basis for the previous accepted sub-template. For instance, if the first translation 31a is regarded as too small for accepting a sub-template based on the image of the second topography position, that image may be discarded and the next sub-template may instead be based on the image of the third topography position 30c, having a translation of the combined first and second translations 31a and 31b in relation to the sub-template based on the image of the first topography position 30a (which may be above a predetermined translation threshold).

Since the sensor 2 is capturing images continuously, the following criteria for images/sub-templates to be accepted for compiling the template may each or in combination be needed for the quality of the compiled template:

Image quality: The system 10 shouldn't extract features and create a sub-template based on a captured image with poor image quality.

Sensor coverage: As the fingerprint topography 30 might be bouncing against the detection surface 32 during a slide interaction, it may be important to gate captured images based on sensor coverage, i.e. the system 10 should not extract features and create a sub-template from captured images with less coverage than a certain threshold, e.g. 80-90%.

Translation: For a given captured image, the system 10 should only save a sub-template if the fingerprint topography 30 has moved since the latest sub-template was accepted. This may be done by applying the translation threshold mentioned above on the translation 31 between the sub-template candidate image and the latest accepted sub-template. Without this criteria, enrolment threshold could theoretically be reached by simply placing the fingerprint topography 30 on the detection surface 32 and holding it still while images are captured and sub-templates extracted until the enrolment threshold is reached. This gating criteria may be specific to slide interactions.

An enrolment progress, e.g. a counter, may be advanced for each accepted sub-template. However, in accordance with the invention, the advancing is dependent on whether the sub-template is from a touch interaction or from a slide interaction. For instance, the progress could be advanced more per accepted sub-template from a touch interaction than per accepted sub-template from a slide interaction. By means of a slide interaction, sliding the topography 30 over the detection surface, the user may quickly add e.g. 40-80 sub-templates, while a normal number of sub-templates from touch interactions (typically one accepted sub-template per touch) may e.g. be 10-20 for a small sensor.

In addition, the accumulated slide translation 31 may be taken into account as a scaling factor. For instance, if the user is sliding only in one primary direction, e.g. up-down only, more sub-templates will be needed for reaching the enrolment threshold.

Enrolment is completed when the enrol threshold is reached and a template 16 has been compiled from the accepted sub-templates. As long as the enrolment threshold has not been reached, a user interface 3 of the device 1 may instruct the user to keep sliding and/or touching.

Figure 5:
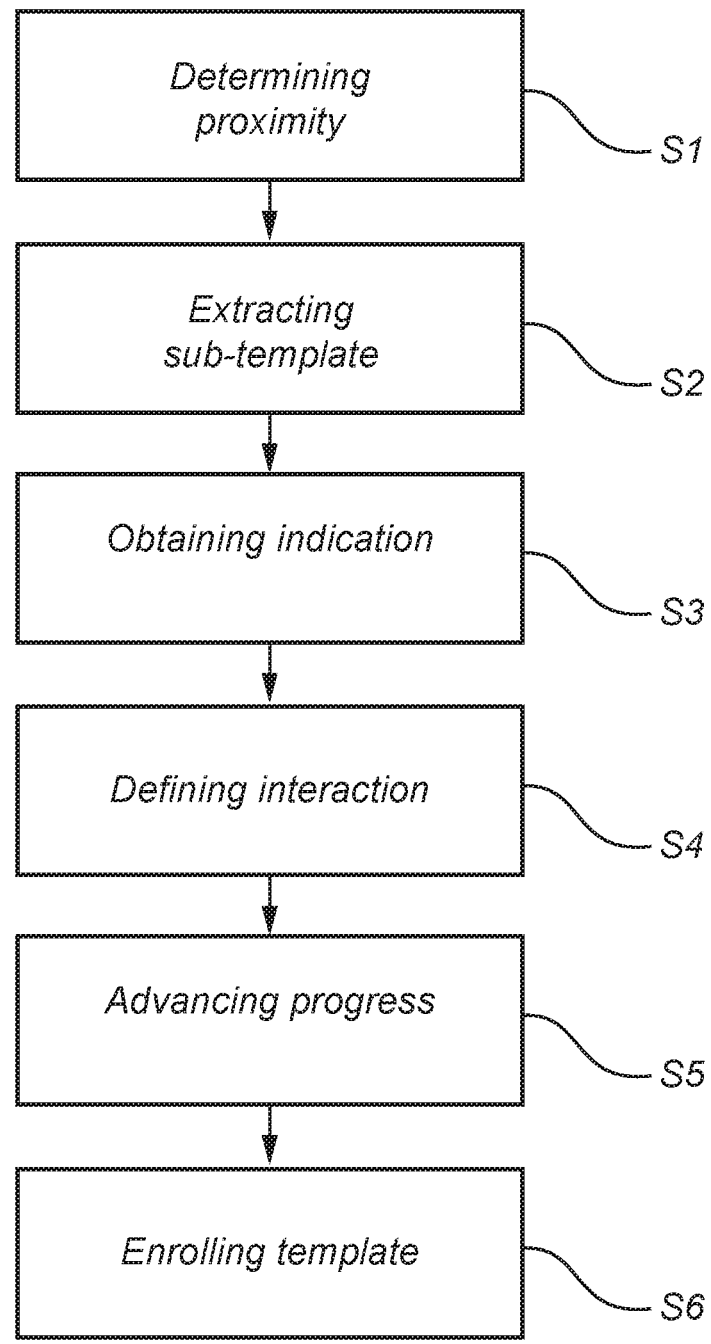
FIG. 5 is a schematic flow chart of an embodiment of a method of the present invention.

FIG. 5 is a flow chart illustrating embodiments of the inventive method. The method is performed in an electronic device 1 comprising a fingerprint sensing system 10 comprising a fingerprint sensor 2 for enrolling a fingerprint template 16 compiled from a time sequence of sub-templates. For each of a plurality of consecutive sub-templates of the time sequence and by means of the fingerprint sensing system 10, the method comprises determining S1 that a fingerprint topography 30 of a finger 4 is in proximity to a detection surface 32 of the fingerprint sensor 2 as part of an interaction of the finger with the fingerprint sensor. The method also comprises extracting S2 the sub-template from a captured image of the topography, which sub-template is consecutive to a preceding sub-template in the time sequence. The method also comprises obtaining S3 an indication about whether or not the topography remained in proximity to the detection surface during a time period between capturing an image from which the preceding sub-template was extracted and the determining S1 that the topography is in proximity to the detection surface. The method also comprises defining S4 the interaction as a slide interaction if, according to the obtained S3 indication, the topography remained in proximity to the detection surface, or as a touch interaction if, according to the obtained S3 indication, the topography did not remain in proximity to the detection surface during said time period. The method also comprises, based on whether the interaction is defined S4 as a slide interaction or a touch interaction, advancing S5 an enrolment progress. Then, the method also comprises, when the enrolment progress has been advanced to above a predetermined enrolment threshold, enrolling S6 the template 16 compiled from the sub-templates.

It is noted that the obtaining S3 of an indication may be performed before, after or concurrently with the extracting S2 of the sub-template, depending on application.

In some embodiments of the present invention, the enrolment progress is advanced with a higher value if the interaction is defined as a touch interaction than if the interaction is defined as a slide interaction. Thus, fewer touch sub-templates may be needed than slide sub-templates for reaching the enrolment threshold. However, typically a combination of both touch sub-templates and slide templates are used to reach the enrolment threshold.

In some embodiments of the present invention, the interaction is defined S4 as a slide interaction for at least one of the plurality of consecutive sub-templates, and the interaction is defined S4 as a touch interaction for at least one other of the plurality of consecutive sub-templates. Thus, a combination of both touch sub-templates and slide templates are used to reach the enrolment threshold.

In some embodiments of the present invention, each of the sub-templates of the time sequence covers an area of the topography 30 corresponding to an area of the detection surface 32 which is smaller than an area of the topography covered by the enrolled S6 template 16. This implies that the sub-templates combine such that the compiled template covers a larger area of the fingerprint topography than the area of the detection surface (typically corresponding to an area of a two-dimensional sensor array of the sensor 2). Thus, a smaller sensor may be used, saving cost. In some embodiments, the area of the detection surface is at most 20 mm$^2$, e.g. less than 15 mm$^2$. The sensor array of the sensor 2 may e.g. have a size of 2-5 times 2-5 mm, e.g. 3-4 times 3-4 mm, such as 3×4 mm.

Thus, in some embodiments of the present invention, the fingerprint sensor 2 comprises a two-dimensional array of fingerprint sensing elements arranged beneath the detection surface 32.

In some embodiments of the present invention, the electronic device 1 is a mobile phone, e.g. a smartphone; a smart card; a tablet computer; a portable computer, e.g. a laptop computer; or a stationary computer, e.g. a desktop computer, a server or a mainframe computer.

Figure 6:
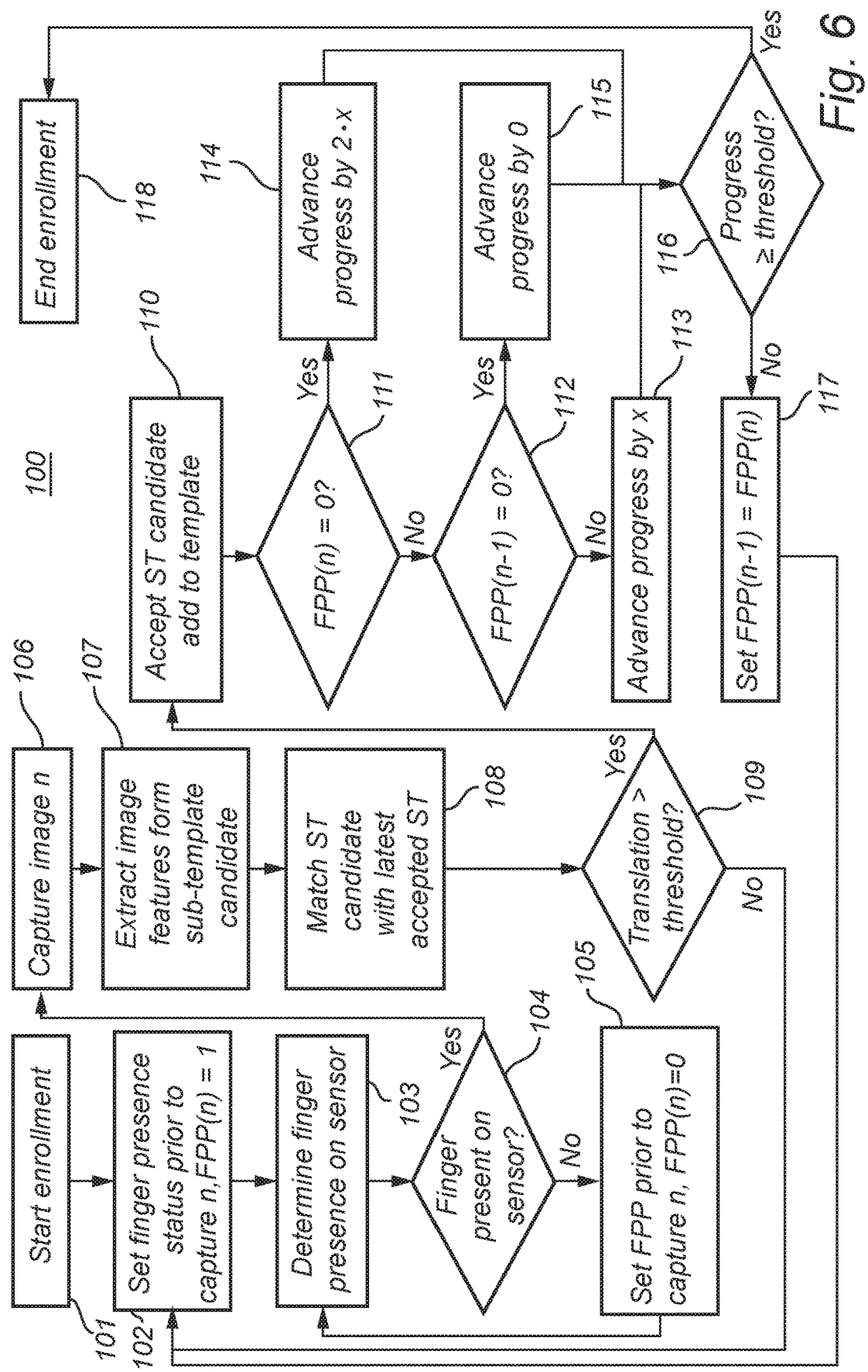
FIG. 6 is a more detailed flow chart of a specific example embodiment of the method of the present invention.

FIG. 6 is a more detailed flow chart of a specific example embodiment of the method of the present invention.

The figure shows a proposed processing flow of the method.

Finger presence status prior (FPP) to any given image capture is detected and communicated to an enrolment module.

The translation 31 associated with any captured image is evaluated relative to the most recent accepted sub-template, e.g. for slide interactions a certain distance (corresponding to the translation threshold) must be swiped before another image is accepted for a sub-template, and for touches only the first image in a sequence related to the same touch will be accepted for a sub-template.

According to the finger presence, the enrolment progress will be multiplied by e.g. 2 for the single accepted sub-template from a touch (while a multiplier of 1 is used for sub-templates from slide interactions). Inevitably, the progress will be advanced by the same amount for the first sub-template from a slide interaction. This is evened out by increasing the progress less for the second (or following 2-5) accepted sub-template of the same slide interaction. The user will not notice this in practice due to the high image capture rate.

Let's say that an accepted ST from a slide interaction should advance the progress by 10% and an accepted ST from a touch interaction should advance the progress by 20%. Then, for an ST sequence of a single slide interaction, progress will be advanced like this: 20, 20, 30, 40, 50, 60, 70, 80, 90, 100%. For an ST sequence of only touch interactions, progress will be advanced like this: 20, 40, 60, 80, 100%. For an ST sequence of two touch interactions and a single slide interaction progress will be advanced like this: 20, 40, 60, 60, 70, 80, 90, 100%.

That is, since it cannot be known when only the first ST is accepted whether the interaction is going to turn out to be a slide or a touch, the first accepted ST in any new interaction will advance progress by 20%. Only when the second ST is accepted, with its associated FPP status, is it known whether the first ST was from a touch interaction or the beginning of a slide interaction. In the case it's a slide interaction, the double advancement of the progress can be compensated by not advancing the progress for the second ST of the slide interaction.

The corresponding series for a case where a touch interaction advances the progress with a factor of 1.5 instead of 2 will be:

For a sequence of a single slide interaction: 15, 20, 30, 40, 50, 60, 70, 80, 100%.

For a sequence of only touch interactions: 15, 30, 45, 60, 75, 90, 100%.

For a sequence of two touch and one slide interaction: 15, 30, 45, 50, 60, 70, 80, 90, 100%.

Referring again to FIG. 6, the enrolment method is started at step 101. The FPP status prior to image capture n is set 102 to one (FPP(n)=1). It is then determined 103 whether 104 a finger (i.e. the fingerprint topography thereof) is in proximity to the detection surface 32. If not, the FPP status prior to image capture n is set 105 to zero (FPP(n)=0) and the method returns to step 103. If yes, image n is captured 106.

Then, image features are extracted 107 from the captured image to form a sub-template candidate. The sub-template candidate is compared 108 to the latest (i.e. most recent previous in the sequence) accepted sub-template and it is determined 109 whether the candidate fulfils the translation threshold criteria. If not, the method returns to step 102. If yes, the sub-template candidate is accepted 110 and added to the template being compiled.

Then, it is determined 111 whether FPP(n) is zero (indicating a touch interaction or a first ST of a slide interaction), in which case the progress is advanced 114 a predetermined amount associated with a touch interaction ST, in this case 2x (x being a predetermined amount of advancement). If not, it is determined 112 whether FPP of the previous captured image n−1 is 0 (indicating that the previous ST was mistakenly assumed to be from a touch interaction), in which case the progress is advanced 115 by zero (i.e. not advanced). If not (indicating that the ST is part of an ongoing slide interaction), the progress is advanced 113 by x.

After the progress has been suitably advanced in any of steps 114, 115 or 113, it is determined 116 whether the progress has reached the enrolment threshold, in which case the template has been compiled and is enrolled 118 (ending the method). If not, the FPP of captured image n−1 is set 117 to the FPP of the captured image n and the method is returned to step 102 and continued.

Thus, in some embodiments of the present invention, the extracting S2 of the sub-template comprises capturing 106 the image of the topography, comparing 108 features of the captured image with corresponding features of the image of the preceding sub-template to obtain a value of translation 31 there between, and determining 109 that the translation value is above a predetermined translation threshold. In some embodiments, the translation threshold is dependent on whether the interaction is defined S4 as a slide interaction or a touch interaction. For instance, a lower translation threshold may be used for slide interactions, and thus a higher translation threshold for touch interactions, e.g. if the enrolment progress is advanced with a higher value if the interaction is defined as a touch interaction than if the interaction is defined as a slide interaction. In this case, the obtaining S3 of an indication may be performed prior to, or concurrently with, the extracting S2 of the sub-template.

In accordance with an example embodiment of the present invention, there is provided a method performed in an electronic device 1 comprising a fingerprint sensor 2. For each of a plurality of consecutive sub-templates, the method comprises determining S1 that a fingerprint 30 is in proximity to the fingerprint sensor as part of an interaction with the fingerprint sensor. The method also comprises extracting S2 the sub-template from a captured image of the fingerprint. The method also comprises obtaining S3 an indication about whether the fingerprint was in proximity to the sensor also during a time period prior to the determining S1. The method also comprises defining S4 the interaction as a slide interaction if the fingerprint was in proximity or as a touch interaction if the fingerprint was not in proximity during the time period. The method also comprises, based on whether the interaction is defined S4 as a slide interaction or a touch interaction, advancing S5 an enrolment progress. When the enrolment progress is advanced to above a predetermined threshold, a template compiled from the sub-templates is enrolled S6.

Embodiments of the present invention may be conveniently implemented in an electronic device 1 using one or more conventional general purpose or specialized digital computer, computing device, machine, or microprocessor, including one or more processors 11, memory and/or computer readable storage media 14 programmed according to the teachings of the present disclosure. Appropriate software coding 15 can readily be prepared by skilled programmers based on the teachings of the present disclosure, as will be apparent to those skilled in the software art. In some embodiments, the present invention includes a computer program product 14 which is a non-transitory storage medium or computer readable medium (media) having instructions 15 stored thereon, in the form of computer-executable components or software (SW), which can be used to program a computer to perform any of the method embodiments of the present invention. Examples of the storage medium can include any type of disk including any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A fingerprint sensing system comprising:
a fingerprint sensor;
processing circuitry; and
data storage storing instructions executable by said processing circuitry whereby said fingerprint sensing system is operative to:
for each of a plurality of consecutive sub-templates of the time sequence:
determine that a fingerprint topography of a finger is in proximity to a detection surface of the fingerprint sensor as part of an interaction of the finger with the fingerprint sensor;
capture the sub-template of the topography, consecutive to a preceding sub-template in the time sequence;
obtain an indication of that the topography remained in proximity to the detection surface during a time period between capturing of the preceding sub-template and the determining that the topography is in proximity to the detection surface, or that the topography did not remain in proximity to the detection surface during said time period;
define the interaction as a slide interaction if, according to the obtained indication, the topography remained in proximity to the detection surface, or as a touch interaction if, according to the obtained indication, the topography did not remain in proximity to the detection surface during said time period; and
based on whether the interaction is defined as a slide interaction or a touch interaction, advance an enrolment progress; and
when the enrolment progress is above a predetermined enrolment threshold, enrol the compiled template.

2. An electronic device comprising the fingerprint sensing system of claim 1.

3. The electronic device of claim 2, wherein the electronic device is a mobile phone, e.g. a smartphone; a smart card; a tablet computer; a portable computer, e.g. a laptop computer; or a stationary computer, e.g. a desktop computer, a server or a mainframe computer.

4. A method performed in an electronic device comprising a fingerprint sensing system comprising a fingerprint sensor for enrolling a fingerprint template compiled from a time sequence of sub-templates, the method comprising, by means of the fingerprint sensing system:
for each of a plurality of consecutive sub-templates of the time sequence:
determining that a fingerprint topography of a finger is in proximity to a detection surface of the fingerprint sensor as part of an interaction of the finger with the fingerprint sensor;

extracting the sub-template from a captured image of the topography, which sub-template is consecutive to a preceding sub-template in the time sequence;

obtaining an indication about whether or not the topography remained in proximity to the detection surface during a time period between capturing an image from which the preceding sub-template was extracted and the determining that the topography is in proximity to the detection surface;

defining the interaction as a slide interaction if, according to the obtained indication, the topography remained in proximity to the detection surface, or as a touch interaction if, according to the obtained indication, the topography did not remain in proximity to the detection surface during said time period; and based on whether the interaction is defined as a slide interaction or a touch interaction, advancing an enrolment progress; and when the enrolment progress is above a predetermined enrolment threshold, enrolling the compiled template.

5. The method of claim 4, wherein the enrolment progress is advanced with a higher value if the interaction is defined as a touch interaction than if the interaction is defined as a slide Interaction.

6. The method of claim 4, wherein for at least one of the plurality of consecutive sub-templates the interaction is defined as a slide interaction, and wherein for at least one other of the plurality of consecutive sub-templates the interaction is defined as a touch interaction.

7. The method of claim 4, wherein the extracting of the sub-template comprises:

capturing the image of the topography;

comparing features of the captured image with corresponding features of the image of the preceding sub-template to obtain a value of translation there between; and determining that the translation value is above a predetermined translation threshold.

8. The method of claim 7, wherein the translation threshold is dependent on whether the interaction is defined as a slide interaction or a touch interaction.

9. The method of claim 4, wherein each of the sub-templates of the time sequence covers an area of the topography corresponding to an area of the detection surface which is smaller than an area of the topography covered by the enrolled template.

10. The method of claim 9, wherein the area of the detection surface is at most 20 mm$^2$.

11. The method of claim 10, wherein the area of the detection surface is less than 15 mm$^2$.

12. The method of claim 4, wherein the fingerprint sensor comprises a two-dimensional array of fingerprint sensing elements arranged beneath the detection surface.

13. A non-transitory computer-readable storage medium having a plurality of instructions stored thereon, which, when executed by the one or more processors, cause the one or more processors to perform the method of claim 4.

* * * * *